United States Patent [19]
Haller et al.

[11] Patent Number: 5,952,730
[45] Date of Patent: Sep. 14, 1999

[54] METHOD FOR SELECTING ONE OF SEVERAL EQUIVALENT OPERATING ELEMENTS TO CONTROL THE LENGTHWISE AND/OR TRANSVERSE DYNAMICS OF A VEHICLE, ESPECIALLY A MOTOR VEHICLE

[75] Inventors: Uwe Haller, Eisingen; Harald Leschke, Sindelfingen, both of Germany

[73] Assignee: Daimler-Benz AG, Germany

[21] Appl. No.: 08/939,439

[22] Filed: Sep. 29, 1997

[30] Foreign Application Priority Data

Sep. 27, 1996 [DE] Germany .............. 196 39 849

[51] Int. Cl.⁶ .................................................. B60K 26/00
[52] U.S. Cl. ................... 307/10.1; 307/10.3; 180/322
[58] Field of Search .................... 307/9.1, 10.1, 307/10.6, 10.7, 10.8, 10.3; 180/321, 322, 323, 272, 273

[56] References Cited

U.S. PATENT DOCUMENTS

| | | | |
|---|---|---|---|
| 2,791,438 | 5/1957 | Ruf | 180/321 |
| 3,785,325 | 1/1974 | Mycroft | 180/321 |
| 4,022,146 | 5/1977 | Sadler | 180/102 |
| 4,361,200 | 11/1982 | Igarashi | 180/321 |
| 4,392,544 | 7/1983 | Dilno | 180/273 |
| 4,485,375 | 11/1984 | Hershberger | 180/272 |
| 4,726,441 | 2/1988 | Conley | 180/322 |
| 4,911,261 | 3/1990 | Conley | 180/322 |
| 4,921,066 | 5/1990 | Conley | 180/322 |
| 5,161,820 | 11/1992 | Vollmer | 180/273 |
| 5,449,956 | 9/1995 | Williams | 307/10.1 |
| 5,519,256 | 5/1996 | Goodridge | 307/10.1 |
| 5,637,927 | 6/1997 | Stronczek et al. | 180/321 |
| 5,808,374 | 9/1998 | Miller et al. | 307/10.1 |
| 5,845,735 | 12/1998 | Mëller et al. | 180/322 |

FOREIGN PATENT DOCUMENTS

| | | |
|---|---|---|
| 0 634 302 A1 | 1/1995 | European Pat. Off. . |
| 195 48 717 C1 | 12/1995 | Germany . |
| WO 88/09279 | 5/1988 | WIPO . |

*Primary Examiner*—Richard T. Elms
*Attorney, Agent, or Firm*—Evenson, McKeown, Edwards & Lenahan, P.L.L.C.

[57] ABSTRACT

A method selects one of several equivalent operating elements for controlling the lengthwise and/or transverse dynamics of a motor vehicle. Inadvertent control of the lengthwise and/or transverse dynamics of the motor vehicle is prevented and manual switching between various operating elements is allowed without a transition to be safely feasible for the participants even while driving. The selected operating element is activated simultaneously when the previous operating element is deactivated, after activation of the selected operating element has been made possible by a selector switch. The method therefore takes place in two steps, with activation of an operating element first being made possible by activating a selector switch. The actual activation takes place at a later point in time, namely when the operating element to be activated is in fact actuated to control the lengthwise and/or transverse movement of the vehicle.

19 Claims, 1 Drawing Sheet

METHOD FOR SELECTING ONE OF SEVERAL EQUIVALENT OPERATING ELEMENTS TO CONTROL THE LENGTHWISE AND/OR TRANSVERSE DYNAMICS OF A VEHICLE, ESPECIALLY A MOTOR VEHICLE

BACKGROUND AND SUMMARY OF THE INVENTION

This application claims the priority of German application 196 39 849.5, the disclosure of which is expressly incorporated by reference herein.

The present invention relates to a method for selecting one of several equivalent operating elements for controlling the lengthwise and/or transverse dynamics of a vehicle, especially a motor vehicle, with the operating elements being operable independently of one another.

In previously unpublished DE 195 48 717.6, various configurations of operating elements are described for controlling the lengthwise and/or transverse dynamics of a motor vehicle. A plurality of operating elements movable from the driver's seat can be provided. In addition, operating elements can be moved from the driver's seat and from the passenger seat, as well as operating elements that can be moved only from the passenger seat.

In order to select one of the operating elements and thus control all the lengthwise and/or transverse dynamics of the vehicle by way of this operating element, DE 195 48 717.6 discloses that the actuating elements are either coupled with one another during actuation, or designed so that their signals are superimposed in an additive manner, are ranked hierarchically with respect to one another, or are switchable manually.

When one operating element is deactivated and another operating element is activated to control lengthwise and/or transverse movement of a vehicle, at the point in time when the switching action takes place it is unclear for a short space of time which operating element is currently active. If a switch is made during driving from operation of the vehicle by the driver to operation by the passenger (or vice versa), exact agreement between the two is required. There is necessarily a short space of time during which the driver has the impression that the passenger has already assumed control of the vehicle by means of an operating element assigned to him, while the passenger is still of the opinion that the driver is still controlling the vehicle.

Moreover, during manual switching, an error regarding the manually selected operating element can occur. If such an error does occur, the driver will initially attempt to operate the vehicle by using the operating elements which he thinks he has selected. A dangerous driving situation thereby results because the vehicle cannot be controlled by the operating element. Until the driver locates the operating element which has actually been activated, a period of time elapses during which an accident cannot be ruled out.

WO 88/09279 discloses two operating elements for controlling transverse movement, each of which can be operated by the driver with one hand. The two operating elements are then rigidly coupled together mechanically.

An object of the present invention is to prevent inadvertent control of the lengthwise and/or transverse dynamics of the motor vehicle and to allow a manual change between various operating elements without a transition and without any danger to those involved, even while driving.

This object has been achieved in the operating elements which form the present invention by essentially providing a method in which the selection of an operating element is effected by a selector switch and completed by subsequent actuation of the selected operating element.

An advantage of the present invention is that activation of the selected operating element takes place simultaneously with deactivation of the previous operating element when the selected operating element is actuated, after activation of the selected operating element has been made possible by a selector switch.

The advantageous method according to the invention therefore takes place in two steps, with activation of an operating element being made possible initially by actuation of the selector switch. The actual activation then takes place at a later point in time, namely when the operating element to be activated is in fact actuated to control lengthwise and/or transverse movement of the vehicle.

According to one advantageous embodiment of the invention, assurance is provided by checking seat occupation that only the operating element can only be actuated which is associated with an actually occupied operating location. Thus, for example, activation of an operating element which can be actuated only from the passenger seat is impossible when the passenger seat is not occupied. As a result, improper operation is advantageously ruled out.

According to another advantageous embodiment, the selected operating element must be actuated within a predetermined time interval, which can, for example, be up to 30 seconds, so that the selection can actually be made. This feature has the advantage that inadvertent actuation of the selector switch does not lead to inadvertent activation of an operating element at a much later point in time as a result of a likewise inadvertent actuation of the operating element. As a result of the time correlation, therefore, the intent of the participant to make a switching maneuver is determined. The duration of the set time interval requires adjustment and can be adjusted, for example, during driving tests in a suitably equipped simulator.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
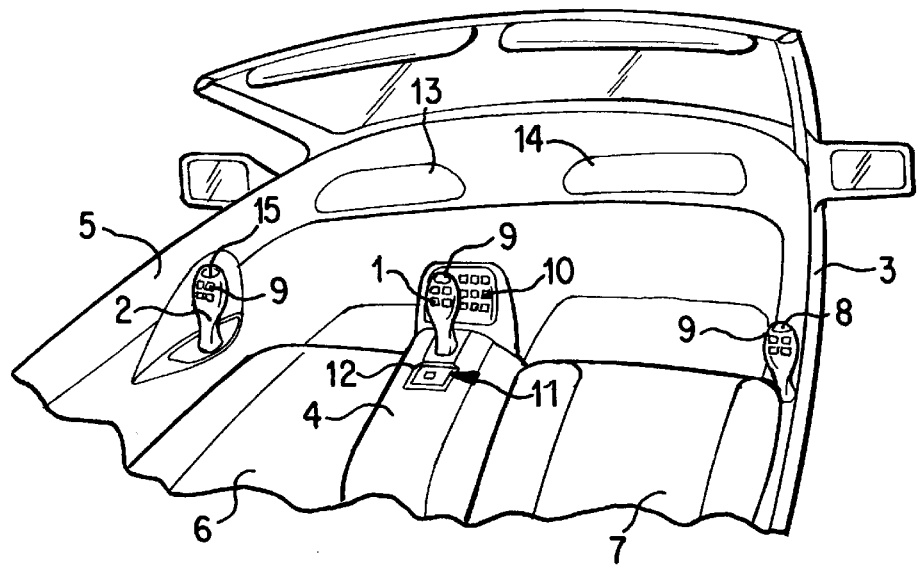
FIG. 1 is a perspective view of a vehicle interior space having a system composed of operating elements in accordance with the method of the present invention.

FIG. 1 shows three operating elements 1, 2, and 8 to control the lengthwise and/or transverse dynamics of a motor vehicle. Each of these operating elements can be actuated independently of the other operating elements, with the handles connected to the operating elements being able to perform the desired control of the lengthwise and/or transverse dynamics of the vehicle.

Operating element 1 is located on center tunnel 4 between driver's seat 6 and passenger seat 7 and therefore can be actuated by both the driver and the passenger. Operating element 2 in the vicinity of driver's door 5 can be reached only by the driver. Operating element 8 in the vicinity of passenger door 3 can be actuated only by the passenger.

In addition, an actuating device 9 is also located on each of operating elements 1, 2, and 8, by which various functions, e.g. the turn signals of the vehicle, can be actuated. Another actuating apparatus 10 is located in the vicinity of center tunnel 4 and can be actuated by both the driver and the passenger.

The vehicle also has two indicators 13, 14 associated with the driver and passenger to display all driving information, such as vehicle speed, oil pressure, coolant temperature, etc. (instrument cluster). If the operating element 2 of the driver is actuated at a given point in time, it is not necessary for the display or indicator 14 of the passenger to display driving information. The display means 14 can then be utilized for any other purpose, e.g. a television screen. It is only when a switch is made to operating element 9 or 8 that driving information must be displayed on the display indicator 14. The same applies to the display indicator 13 when the vehicle cannot be operated from driver's seat 6.

Selector switch 11 for selecting an operating element has a switch button 12 which automatically returns to its illustrated rest position. Switch button 12 of the selector switch 11 can be displaced both leftward and rightward from the rest position. In this way, a corresponding operating element can be selected.

Figure 2:
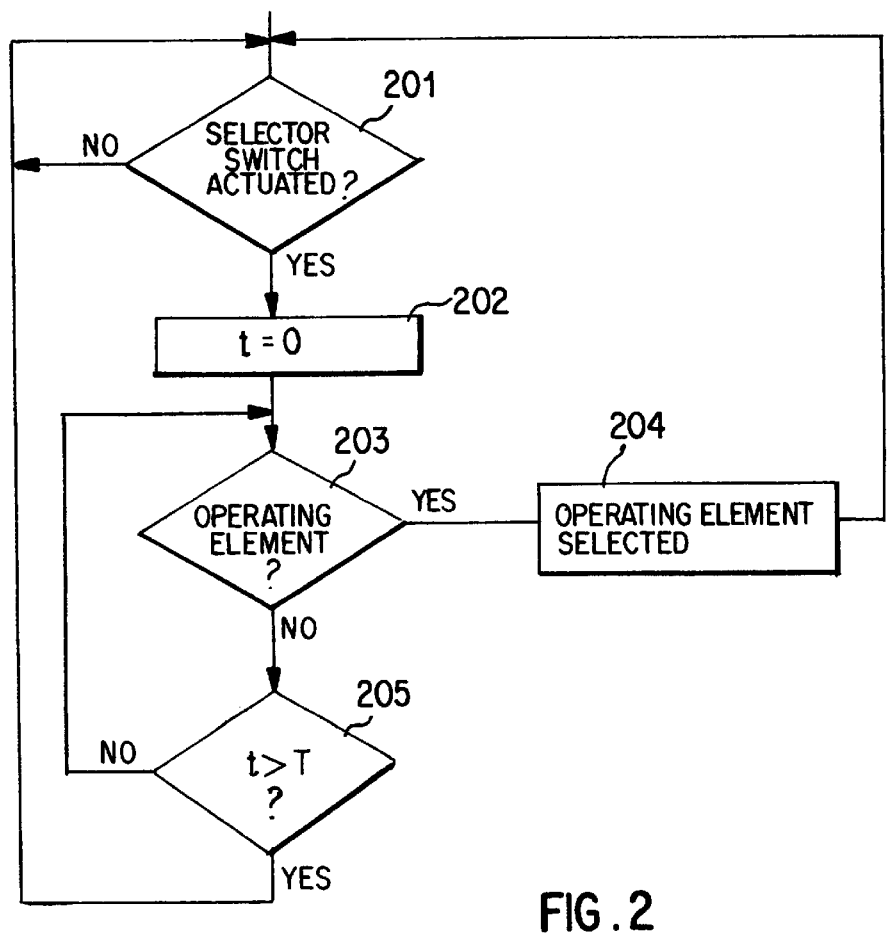
FIG. 2 is a flowchart of a method according to the present invention used in the system of FIG. 1.

If the selector switch 11 is actuated when the engine of the vehicle is at rest, initially the engine is started and a predetermined operating element, e.g. operating element 2, is activated. Operating element 2 is, however, activated only if driver's seat 6 is occupied. If it is not occupied and the passenger seat 7 is occupied, operating element 8 can be activated. If the driver or passenger would like to select an operating element other than the one that has been predetermined, he must, as shown in FIG. 2, select another operating element. If neither of the two seats 6, 7 is occupied, starting cannot occur and the operating functions of operating elements 1, 2, and 8 are blocked. That is, all the operating elements are deactivated.

According to the method sequence illustrated in FIG. 2, a check is made in step 201 to determine whether the selector switch 11 has been actuated. If not, a return is made to step 201. The selector switch 11 is operated, for example, by displacing the switch button 12 leftward or rightward. If the selector switch button 12 is displaced leftward, the operating element located to the left of the currently active operating element can be selected. If, for example, the operating element 1 is selected first, the operating element 2 can be selected by displacing the switch button 12 leftward. Displacement of the switch button 12 rightward in this situation would permit selection of the operating element 8.

If the operating element 2 is selected initially, operating element 1 can be selected by actuating switch button 12 rightward. When the switch button 12 is actuated leftward, either no other operating element is selected or operating element 8 is selected, according to an imaginary cyclical arrangement of the operating elements. The same is true if the operating element 8 is initially selected.

If a determination is made in Step 201 that the switch button 12 or the selector switch 11 has been actuated, time t is reset to zero in Step 202. Then a check is made in step 203 to determine whether the operating element whose selection has been made possible is, in fact, being actuated. Actuation can occur when a position change of the operating element takes place, or when an actuator 9 on the corresponding operating element is actuated, or when the gripping of the corresponding operating element by the driver or the passenger is detected by a suitable sensor.

If a determination is made in Step 203 that the selected operating element has been actuated, the selection is made according to Step 204. At the same time, the previously selected operating element no longer remains active, in other words a position change in the previously selected operating element no longer controls the vehicle.

A check is made in Step 205 as to whether the time interval T since time t was reset has been exceeded. If not, a return is made to Step 203. Otherwise, a jump is made to Step 201, and selection of an operating element without previous actuation of the switch button 12 is then no longer possible.

Alternatively, a conventional sensor 15 in the form of switch, optical cell, capacity sensor or the like can be installed at an appropriate location in the operating elements or handles 1, 2 and 8. Grasping of the handle or element in the location of the sensor sends a signal that actuation of that element has occurred.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for selecting one of at least two equivalent operating elements for controlling at least one of lengthwise and transverse dynamics of a vehicle, comprising the steps of selecting one of the operating elements via a selector switch; and subsequently actuating the selected one operating element completely independently from the other operating elements such that at least two of the operating elements are selectively actuatable from a single seat location in the vehicle.

2. The method according to claim 1, wherein one of the operating elements is assigned to a predetermined operating location, and the one operating element is selectable only when the predetermined operating location is occupied.

3. The method according to claim 1, wherein, the step of selecting requires actuation of the one operating element within a predetermined time interval following actuation of the selector switch.

4. The method according to claim 1, wherein the selector switch has an automatically reset switch button actuatable in a direction from a currently selected one of the operating elements toward another one of the operating elements to permit selection of the another one of the operating elements.

5. The method according to claim 1, wherein actuation of the selector switch with a vehicle motor switched off causes the vehicle motor to start.

6. The method according to claim 5, wherein upon starting of the vehicle motor, a predetermined one of the operating elements is activated when an operating location associated with the predetermined operating element is appropriated actuated.

7. The method according to claim 1, wherein a chance of position of the selected one of the operating elements effects actuation thereof.

8. The method according to claim 1, wherein actuation of the selected one of the operating elements is deemed to have occurred when a grasping of the selected one of the operating elements is detected by a sensor.

9. The method according to claim 1, wherein, simultaneously with further selection of one of the operating elements which is different from that operating element assigned to a current operating location, at least one of plural actuators and displays are deactivated at the current operating location and are activated at the operating location associated with the further selected one of the operating elements.

10. The method according to claim 9, wherein one of the operating elements is assigned to a predetermined operating location and is selectable only when the predetermined operating location is occupied by a passenger or driver.

11. The method according to claim 1, wherein the currently selected one of the operating elements remains activated until completion of control of at least one of the vehicle dynamics.

12. The method according to claim 11, wherein one of the operating elements is assigned to a predetermined operating location, and the one operating element is selectable only when the predetermined operating location is occupied.

13. The method according to claim 11, wherein, the step of selecting requires actuation of the one operating element within a predetermined time interval following actuation of the selector switch.

14. The method according to claim 11, wherein the selector switch has an automatically reset switch button actuatable in a direction from a currently selected one of the operating elements toward another one of the operating elements to permit selection of the another one of the operating elements.

15. The method according to claim 11, wherein actuation of the selector switch with the vehicle motor switched off causes a vehicle motor to start.

16. The method according to claim 15, wherein upon starting of the vehicle motor, a predetermined one of the operating elements is activated when an operating location associated with the predetermined operating element is appropriated actuated.

17. The method according to claim 11, wherein a change of position of the selected one of the operating elements effects actuation thereof.

18. The method according to claim 11, wherein actuation of the selected one of the operating elements is deemed to have occurred when a grasping of the selected one of the operating elements is detected by a sensor.

19. The method according to claim 11, wherein, simultaneously with further selection of one of the operating elements which is different from that operating element assigned to a current operating location, at least one of plural actuators and displays are deactivated at the current operating location and are activated at the operating location associated with the further selected one of the operating elements.

* * * * *